June 25, 1946.  E. PELL  2,402,573
FREQUENCY RELAY CIRCUIT
Filed Feb. 23, 1944
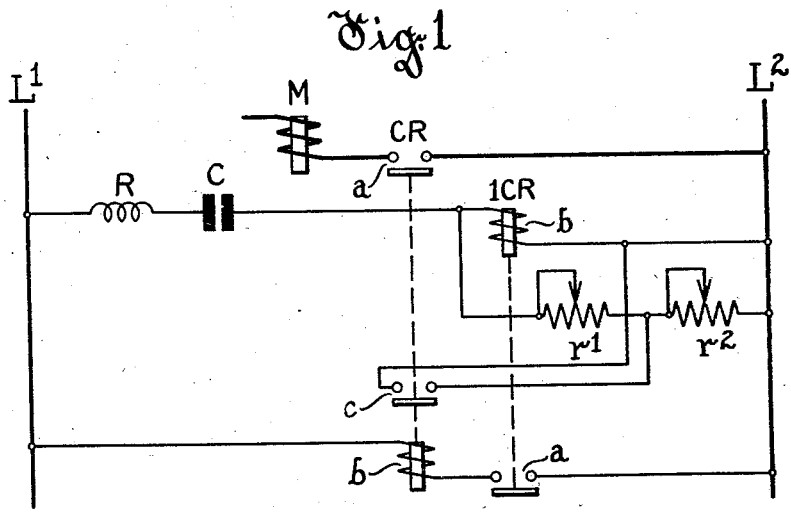
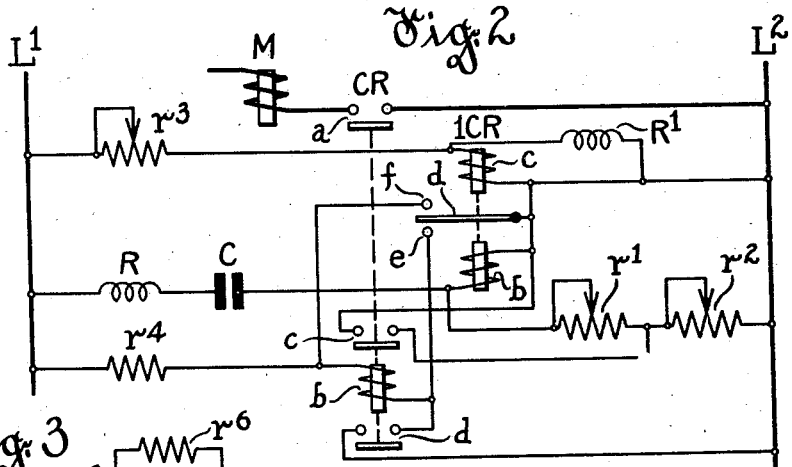
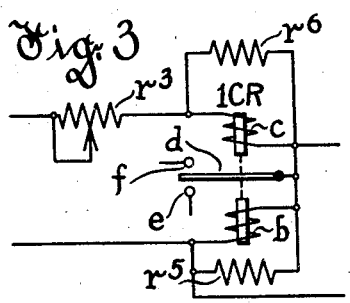
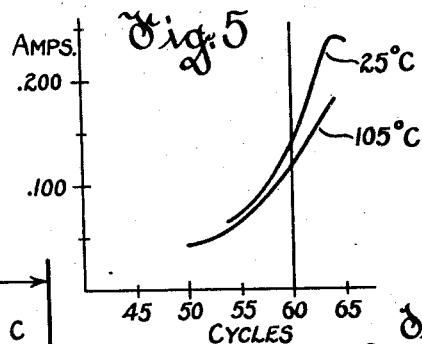
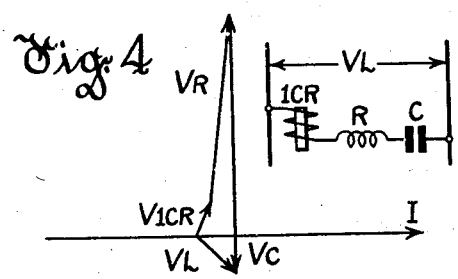
Inventor
Eric Pell
By *[signature]*
Attorney Patented June 25, 1946

2,402,573

UNITED STATES PATENT OFFICE 2,402,573

FREQUENCY RELAY CIRCUITS

Eric Pell, Shorewood, Wis., assignor to Cutler-Hammer, Inc., Milwaukee, Wis., a corporation of Delaware Application February 23, 1944, Serial No. 523,531

7 Claims. (Cl. 175—294)

This invention relates to frequency relay circuits.

More particularly the invention relates to such a circuit especially advantageous for but not limited to automatic substation control, for disconnection of a synchronous motor from a reclosing feeder in case of an outage of that feeder for a period sufficient to allow the motor to get out of step with the line. As will be understood, disconnection of the motor in such a case is necessary to prevent objectionable surges as would occur should the motor remain in circuit with its field switch closed and should the motor be reenergized at subsynchronous speed. On the other hand, it is desirable in such a case to have the motor remain in circuit for reenergization if the frequency drop is only slight, and to effect reconnection of the motor automatically under given conditions where it has been disconnected because of prolonged outage of the feeder, requirements in the case of a 60 cycle system customarily being disconnection at 56-57 cycles and reconnection at 59 cycles.

An object of the present invention is to provide an improved frequency relay circuit for such and other uses which may be readily constructed and adjusted for a frequency range such as that aforementioned and for performance with reliability.

Various other objects and advantages of the invention will hereinafter appear.

The accompanying drawing illustrates diagrammatically an embodiment of the invention which will now be described, it being understood that the embodiment illustrated is susceptible of modifications without departing from the scope of the appended claims.

In the drawing,

Figure 1 is a diagrammatic view of the proposed circuit in a simple form;

Fig. 2 is a diagrammatic view of the same circuit with certain additions;

Fig. 3 shows diagrammatically a further modification of the circuit;

Fig. 4 depicts certain voltage drops, and

Fig. 5 depicts the characteristic current frequency curve.

Referring to the drawing, the same shows an operating winding M for a suitable motor control switch or other instrumentality to be controlled by the frequency relay circuit through the medium of a relay CR having contacts $a$ in circuit with winding M. The contacts $a$ are shown as of the normally disengaged type to be engaged when the winding $b$ of the relay is energized. The relay also has normally disengaged contacts $c$ for a purpose later set forth.

The relay CR is in turn controlled by a frequency relay ICR through the medium of contacts $a$ of the latter relay which contacts are in circuit with the winding $b$ of relay ICR. The relay ICR has its contacts $a$ normally disengaged and has a control winding $b$ connected across lines $L^1$, $L^2$ through a reactor R and a condenser C in series. Also the circuit comprises resistors $r^1$ and $r^2$ which are connected in series relation and in parallel with the winding of relay ICR, both resistors being shown as adjustable.

As will now be apparent, energization of winding M is dependent upon response of relay CR, whereas response of relay CR is dependent upon prior response of the frequency relay ICR. Likewise it will be apparent that both relays must remain energized for continued energization of winding M, drop out of the frequency relay effecting drop out of relay CR to interrupt the circuit of winding M. When both relays are open as shown, both resistors $r^1$ and $r^2$ are in parallel with the winding of the frequency relay for adjustment of said relay to respond at a predetermined frequency, whereas upon response of both relays progressively the contacts $c$ of relay CR short-circuit resistor $r^2$ for adjustment of relay ICR to release at a predetermined lower frequency.

With a circuit of the construction shown, relay ICR has greater sensitivity to frequency changes as the reactance of the reactor and condenser is made higher in relation to the net resistance of the circuit. The net drop across the reactor and condenser in series preferably is ⅛ to ⅕ of the drop across the condenser as depicted in Fig. 4. Where the voltage drop across the condenser at 60 cycles is higher than that across the reactor there is obtained an operating characteristic as depicted by the curve in Fig. 5.

In adjusting the circuit it is preferable first, with the relays closed to adjust resistor $r^1$ for drop out of relay ICR under the desired conditions and then to adjust resistor $r^2$ for response of relay ICR under the desired conditions with relay CR open. It has been found that using a standard relay, a 1 mf. condenser and 7 henry reactor it is possible to narrow the operating range in a 60 cycle circuit for pickup at 59 cycles and drop out at 57 cycles, whereas refinement of design renders possible reduction of such range.

Inasmuch as the winding of relay ICR is shunted by a resistor it will be apparent that a change in the resistance of the winding due to changes in its temperature will affect the current distribution between the two parallel circuits. This undesirable influence can be eliminated by use of resistor material such as to give the same relative change in the resistance of the two parallel circuits. On the other hand, due to the large reactance of the condenser and reactor the effect of a change in the resistance of the winding is very small, amounting only to approximately 1 cycle per second for a temperature change of 80 deg. C., as indicated in Fig. 5, wherefore in some instances at least it may be neglected.

Also as will be apparent, the operating characteristic is subject to influence by line voltage variation and compensation for line voltage variation may in some instances be desirable. Such compensation may be effected in various ways, as for example by the modification shown in Fig. 2. In this instance the relay ICR is of the differential type having a second winding $c$ connected across the line through a resistor $r^3$. The windings $b$ and $c$ of the relay exert opposing pulls on an armature member $d$ constituting the movable contact element of a double throw switch having a down contact $e$ and an up contact $f$. The relay ICR obviously will function in response to its winding $b$ to complete through its contact $e$ the energizing circuit of relay CR as in the circuit of Fig. 1 except that such action of said relay will be subject to opposition by the winding $c$ and as both windings $b$ and $c$ will be affected alike by changes in line voltage, said action of the relay will be governed by frequency alone. The up contact $f$ of relay ICR is connected through a resistor $r^4$ to line $L^1$ and when engaged by the movable contact $d$ of the relay provides for short-circuiting of the winding of relay CR. In this instance it will be noted that relay CR has auxiliary contacts $d$ which upon response of said relay establish a maintaining circuit therefor, such maintaining circuit extending from line $L^1$ through resistor $r^4$ to and through winding $b$ of said relay and thence through its contacts $d$ to line $L^2$.

In practice it has been found that the relay of Fig. 2 may be made sufficiently sensitive to enable the resistors $r^1$ and $r^2$ to be eliminated if desired, and it has also been found advantageous to provide means to bring the current of winding $c$ in phase with the current of winding $b$. To accomplish this the winding $c$ may be provided with a suitable reactor $R^1$ in parallel therewith as shown in Fig. 2, this resulting in a tendency to balance the torque on the armature $d$ at any point in the alternating current wave. As will be understood, such tendency may also be produced by including a rectifier in the circuit of one winding or a rectifier in the circuit of each winding. Also as will be understood, it is advantageous to provide the cores of the windings $b$ and $c$ with shading coils to further equalize the magnetic pull throughout the cycle.

Compensation for both line voltage variations and temperature changes may be accomplished by using the circuit of Fig. 2 with an addition shown in Fig. 3. In Fig. 3 the windings $b$ and $c$ of relay ICR respectively have in shunt therewith resistors $r^5$ and $r^6$ to be formed of material with temperature coefficient such that the current flow through the windings will be unaffected by temperature changes. As will be understood, material suitable for this purpose is available, wherefore further explanation of this proposed modification is deemed unnecessary.

What I claim as new and desire to secure by Letters Patent is:

1. A control circuit for a frequency relay, which circuit comprises a winding for the relay, a reactor, a condenser, resistors and connections for all such elements to render said winding responsive at a given frequency for one function thereof, said connections including means operable to exclude certain of said resistors thereby to vary the sensitivity of said winding to frequency change, for another function of said winding.

2. In a control circuit for a frequency relay, in combination, a winding for the relay, a reactor, a condenser, resistors, connections for all of such elements to render said winding responsive at a given frequency for one function thereof, and means acting upon response of said winding to exclude from circuit certain of said resistors thereby to vary the sensitivity of said winding to frequency change, for another function of said winding.

3. A control circuit for a frequency relay, which circuit comprises a winding for the relay, a reactor, a condenser, resistors and connections including means to establish selectively a circuit for all such elements with said winding paralleled by said resistors and in series with said condenser and said reactor or a like circuit exclusive of certain of said resistors, the drop across the condenser alone being in value several times that of the drop across the reactor and condenser in series.

4. A control circuit for a frequency relay, which circuit comprises a winding for the relay, a reactor, a condenser, resistors and connections for all such elements to render said winding responsive at a given frequency for one function thereof, said connections including means operable to exclude certain of said resistors thereby to vary the sensitivity of said winding to frequency change for another function, and means rendering said winding controllable by frequency alone under varying voltage conditions.

5. A control circuit for a frequency relay, which circuit comprises a winding for the relay, a reactor, a condenser, resistors and connections for all such elements to render said winding responsive at a given frequency for one function thereof, said connections including means operable to exclude certain of said resistors thereby to vary the sensitivity of said winding to frequency change for another function, and means to protect the frequency sensitivity of said winding against voltage variations or changes in temperature of said winding.

6. The combination with a frequency relay having a control winding to be sensitive to frequency changes and also means including a biasing winding to relieve the former winding of interference with its sensitivity by varying voltage, of a reactor and a condenser in series with said control winding, the reactance of said reactor and said condenser being high relative to the net resistance of the circuit and the drop across the condenser alone being several times that of the drop across the reactor and condenser in series.

7. The combination with an electroresponsive relay comprising a winding through the medium of which it is rendered responsive and releasable at predetermined frequencies of an alternating current supplied to said winding, of a condenser in series with said winding and a reactor separate from said relay and in series with said condenser and said winding, said reactor having in respect of said relay a relatively large reactance value and a relatively low power factor making possible the use of a light and sensitive relay of low reactance value.

ERIC PELL.